US007454274B2

(12) United States Patent
Uemura et al.

(10) Patent No.: US 7,454,274 B2
(45) Date of Patent: Nov. 18, 2008

(54) IN-VEHICLE DEVICE

(75) Inventors: Hideyuki Uemura, Kanagawa (JP); Eiji Yamamoto, Saitama (JP); Shinichi Maru, Chiba (JP)

(73) Assignee: Sony Corporation, Tokyo (JP)

( * ) Notice: Subject to any disclaimer, the term of this patent is extended or adjusted under 35 U.S.C. 154(b) by 605 days.

(21) Appl. No.: 11/069,951

(22) Filed: Mar. 3, 2005

(65) Prior Publication Data

US 2005/0234619 A1 Oct. 20, 2005

(30) Foreign Application Priority Data

Mar. 10, 2004 (JP) ............................ 2004-067857

(51) Int. Cl.
*G06F 17/00* (2006.01)

(52) U.S. Cl. ........................................................ 701/36

(58) Field of Classification Search .................... 701/36
See application file for complete search history.

(56) References Cited

U.S. PATENT DOCUMENTS

2003/0103634 A1* 6/2003 Ito .............................. 381/86
2005/0043864 A1* 2/2005 Echtenkamp .................. 701/1

FOREIGN PATENT DOCUMENTS

JP 2001-245383 9/2001
JP 2002-104105 4/2002

* cited by examiner

*Primary Examiner*—Thu V. Nguyen
(74) *Attorney, Agent, or Firm*—Oblon, Spivak, McClelland, Maier & Neustadt, P.C.

(57) ABSTRACT

An in-vehicle device having a plurality of output units. The device includes content provision units for individually outputting, to each of users, a piece of content arbitrarily chosen by the user from a plurality of pieces of content, using one of the plurality of output units. The device includes a user recognition unit for individually recognizing the user who receives the piece of content through the one of the plurality of output units. The device includes a storage unit for individually storing the piece of content provided to the user. The device further includes a control unit for, when the user recognition means recognizes that a user to receive the piece of content through the one of the plurality of output units is changed to another user, outputting a piece of content corresponding to the another user by controlling the content provision unit.

6 Claims, 7 Drawing Sheets

IN-VEHICLE DEVICE

BACKGROUND OF THE INVENTION

1. Field of the Invention

The present invention relates to an in-vehicle device and, for example, to one which is preferably used to individually provide different pieces of music through a plurality of speakers provided for respective seats.

2. Description of the Related Art

In-vehicle devices in the past include a four-channel one in which a speaker is provided for each of a driving seat, passenger seat, rear right seat, and rear left seat. The device is configured to individually output, from the four speakers, four pieces of music played by an audio unit located near the driving seat (see, e.g., Japanese Patent Laid-Open No. 2003-111199).

SUMMARY OF THE INVENTION

The in-vehicle device with the arrangement individually outputs different pieces of music chosen by users in their seats, from the speakers for the seats. However, this device cannot cope with a case wherein the users change their seats. Each user is forced to perform troublesome operation such as choosing a piece of music again in his seat after the change. This is very user-unfriendly for the users.

The present invention has been made in consideration of the above-mentioned problem, and has as its object to propose an in-vehicle device having a plurality of output means which can control the output of a piece of music in response to a change of a user's seat even when the piece of music is being played and is highly user-friendly.

To solve the problem, according to the present invention, there is provided an in-vehicle device which, when outputting, to each of users, a piece of content arbitrarily chosen by the user from a plurality of pieces of content, using one of the plurality of output means, the user who receives the piece of content through the one of the plurality of output means is individually recognized, which piece of content is provided to the user is prestored, and when it is recognized that a user to receive the piece of content through the one of the plurality of output means is changed to another user, a piece of content corresponding to the other user is output.

With this arrangement, if a user to receive a piece of content different from others through one of the output means is changed to another user, the other user himself can automatically receive, through the one of the output means serving as a change destination, the same piece of content as that having been received from another one of the output means.

According to the present invention, if a user to receive a piece of content different from others through one of the output means is changed to another user, the other user himself can automatically receive, through the one of the output means serving as a change destination, the same piece of content as that having been received from another one of the output means. Thus, an in-vehicle device and an in-vehicle device output control method and output control program with greatly improved user-friendliness can be implemented.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

An embodiment of the present invention will be described below in detail with reference to the drawings.

(1) Overall Arrangement of In-Vehicle Audio System

Figure 1:
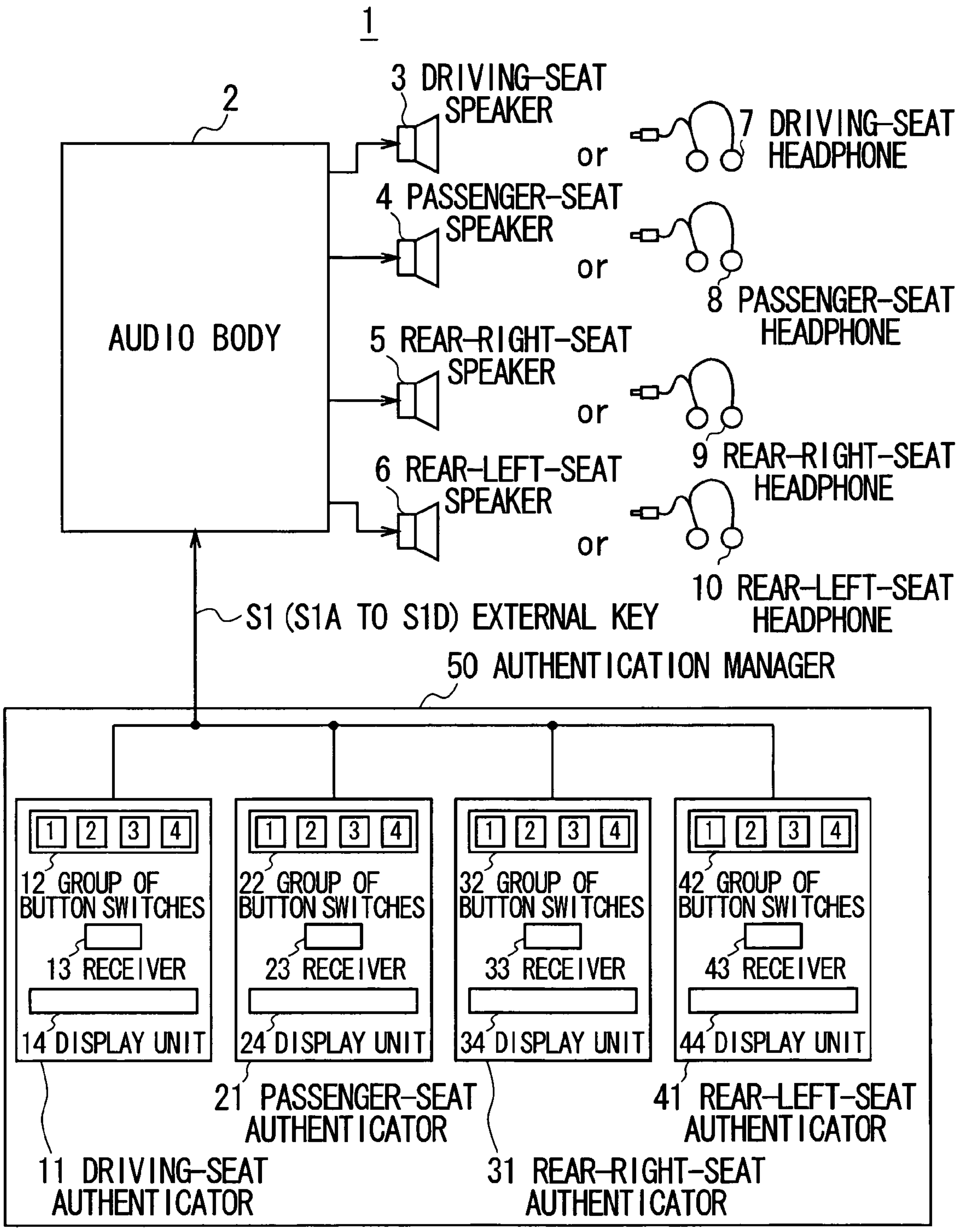
FIG. 1 is a schematic block diagram showing the overall arrangement of an in-vehicle audio system according to the present invention.

In FIG. 1, reference numeral 1 denotes an in-vehicle audio system serving as an in-vehicle device according to the present invention as a whole. The in-vehicle audio system 1 comprises an audio body 2; a driving-seat speaker 3 or driving-seat headphone 7, a passenger-seat speaker 4 or passenger-seat headphone 8, a rear-right-seat speaker 5 or rear-right-seat headphone 9, and a rear-left-seat speaker 6 or rear-left-seat headphone 10, all of which are connected to the audio body 2; and an authentication manager 50 connected to the body 2.

In the in-vehicle audio system 1, whether to output music to users in their seats through the driving-seat speaker 3, passenger-seat speaker 4, rear-right-seat speaker 5, and rear-left-seat speaker 6 or through the driving-seat headphone 7, passenger-seat headphone 8, rear-right-seat headphone 9, and rear-left-seat headphone 10 depends on the intention of the users in the seats.

The authentication manager 50 is configured to individually authenticate users in their seats with a driving-seat authenticator 11 provided near a driving seat, a passenger-seat authenticator 21 provided near a passenger seat, a rear-right-seat authenticator 31 provided near a rear-right-seat, and a rear-left-seat authenticator 41 provided near a rear-left-seat. The authentication manager 50 is configured to output the authentication results as external keys S1 to the audio body 2.

Groups 12, 22, 32, and 42 of button switches, each having button switches "1" to "4", are provided in the driving-seat authenticator 11, passenger-seat authenticator 21, rear-right-seat authenticator 31, and rear-left-seat authenticator 41, respectively. The driving-seat authenticator 11 is configured to be able to recognize that the button switches "1" correspond to Mr. A in the driving seat and output the recognition result as an external key S1A to the audio body 2 when, for example, Mr. A registers the button switches "1" as ones corresponding to him.

Similarly, when Mr. B in the passenger seat registers the button switches "2" as ones corresponding to him, the passenger-seat authenticator 21 can recognize that the button switches "2" correspond to him and outputs the recognition result as an external key S1B to the audio body 2.

When Mr. C in the rear-right seat and Mr. D in the rear-left seat register the button switches "3" and "4", respectively, as ones corresponding to them, the rear-right-seat authenticator 31 and rear-left-seat authenticator 41 can recognize that the button switches "3" correspond to Mr. C and the button switches "4" correspond to Mr. D and output the recognition results as external keys S1C and S1D to the audio body 2.

The authentication manager 50 is configured to, if, for example, a user depresses the button switch "3" of the driving-seat authenticator 11, recognize that the user is Mr. C and that he is sitting in the driving seat and output the external key S1C to the audio body 2. The authentication manager 50 is configured to, if another user depresses the button switch "1" of the rear-right-seat authenticator 31, recognize that the user is Mr. A and that he is sitting in the rear-right seat and output the external key S1A to the audio body 2.

Receivers 13, 23, 33, and 43 for non-contact IC cards are also provided in the driving-seat authenticator 11, passenger-seat authenticator 21, rear-right-seat authenticator 31, and rear-left-seat authenticator 41, respectively, to authenticate Messrs. A to D. The authenticators 11, 21, 31, and 41 are configured to read the non-contact IC cards of Messrs. A to D with the receivers 13, 23, 33, and 43 and recognize their user identifications (IDs). With this arrangement, the authenticators 11, 21, 31, and 41 can recognize in which seat each of Messrs. A to D sits and from which speaker he receives music.

Display units 14, 24, 34, and 44, each comprising an LCD, are further provided in the driving-seat authenticator 11, passenger-seat authenticator 21, rear-right-seat authenticator 31, and rear-left-seat authenticator 41. The display units 14, 24, 34, and 44 are configured to notify users in their seats of various information by displaying the title and elapsed playing time of each piece of music being played, and various other pieces of content.

(2) Circuitry of Audio Body

Figure 2:
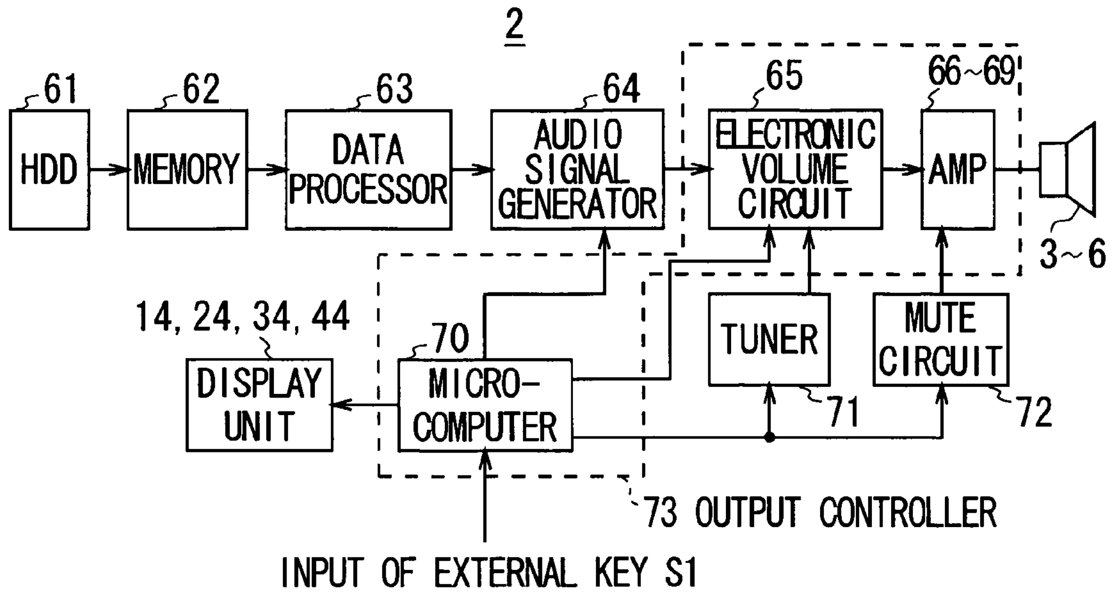
FIG. 2 is a schematic block diagram showing the circuitry of an audio body 2.

As shown in FIG. 2, in the audio body 2, a microcomputer 70 comprising a Central Processing Unit (CPU) included in an output controller 73 controls the whole and runs a basic program stored in Read Only Memory (ROM) (not shown) and an application program (an output control program and content provision program) on Random Access Memory (RAM) (not shown). The audio body 2 is configured to perform a normal audio play function and the procedure for an output control process (to be described later) with the operation.

The audio body 2 plays a large number of music data stored in the hard disk of a hard disk drive 61 incorporated in the audio body 2. To this end, the audio body 2 sends out the data to be played to a data processor 63 through memory 62. The music data need not necessarily be stored in the hard disk and may be stored in various disc-shaped recording media such as a Compact Disc (CD), Mini Disc (MD), Blu-ray disc, and the like.

The hard disk drive 61 is configured to be able to almost simultaneously play pieces of music for four channels by moving and controlling its magnetic head at high speed. The hard disk drive 61 is configured to output the data of the pieces of music to be played from the driving-seat speaker 3, passenger-seat speaker 4, rear-right-seat speaker 5, and rear-left-seat speaker 6 located in the space in a vehicle through the data processor 63, an audio signal generator 64, an electronic volume circuit 65, and amplifiers 66 to 69 (to be described later) while buffering the data in the memory 62. With this arrangement, the hard disk drive 61 can provide the pieces of music for the four channels to Messrs. A to D continuously and almost concurrently.

The data processor 63 subjects data to be played to processing according to a predetermined format and sends out the processing result to the audio signal generator 64. The audio signal generator 64 generates an audio signal corresponding to a preset mode (e.g., any of a concert mode, hall mode, and jazz mode) and sends it out to the electronic volume circuit 65.

The electronic volume circuit 65 outputs the audio signal to the amplifiers 66 to 69 under the control of the microcomputer 70. The electronic volume circuit 65 is also configured to select one of a radio reception signal chosen with a tuner 71 and the audio signal under the control of the microcomputer 70 and output the selected one to the amplifiers 66 to 69.

The amplifiers 66 to 69 amplify the audio signal input from the electronic volume circuit 65 and output the amplification results through the driving-seat speaker 3, passenger-seat speaker 4, rear-right-seat speaker 5, and rear-left-seat speaker 6, thereby providing the pieces of music to the users in their seats. The microcomputer 70 is also configured to be able to control the output from the amplifiers 66 to 69 to the speakers 3 to 6 by controlling a mute circuit 72.

The microcomputer 70 is configured to determine on the basis of the external keys S1 (S1A to S1D) supplied from the authentication manager 50 which piece of music is provided through each of the driving-seat speaker 3, passenger-seat speaker 4, rear-right-seat speaker 5, and rear-left-seat speaker 6 and perform the output control process (to be described later).

(3) Output Control Method

Figure 3:
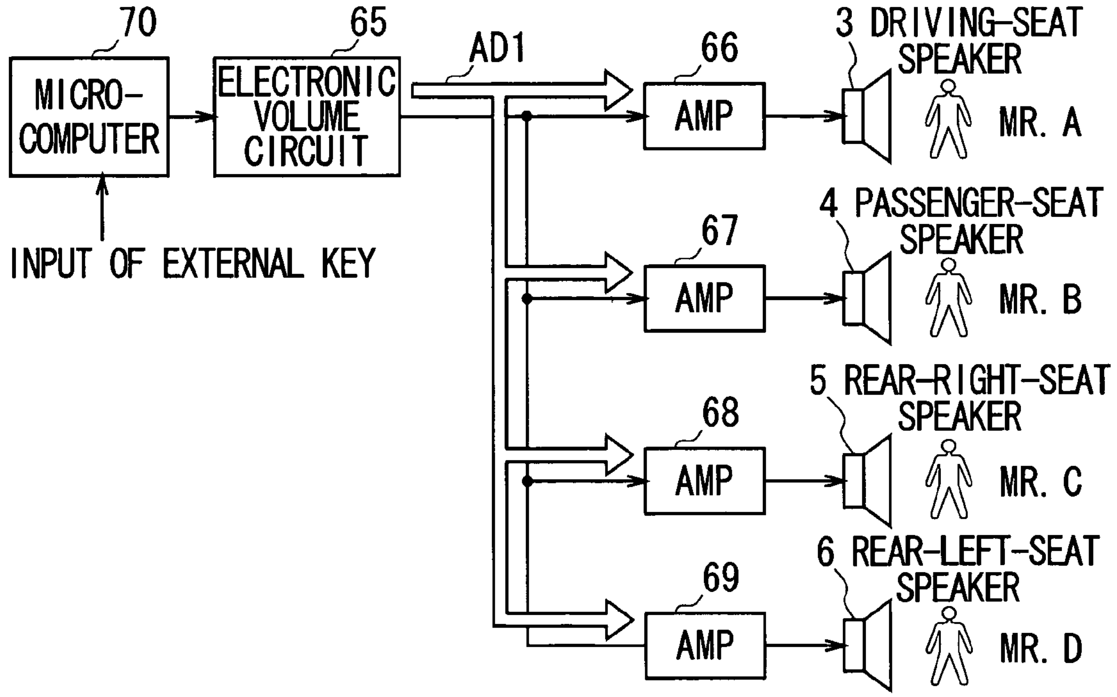
FIG. 3 is a schematic diagram for explaining an output control method (1)

More specifically, as shown in FIG. 3, the microcomputer 70 is configured to be able to output an audio signal AD1 of the same piece of music from all of the driving-seat speaker 3, passenger-seat speaker 4, rear-right-seat speaker 5, and rear-left-seat speaker 6 through the amplifiers 66 to 69, as a basic output control method (1).

Since the same piece of music is provided from all of the driving-seat speaker 3, passenger-seat speaker 4, rear-right-seat speaker 5, and rear-left-seat speaker 6 in this case, all of Messrs. A to D in their seats can listen to and enjoy the same piece of music.

The microcomputer 70 is configured to be able to output the audio signal AD1 of the same piece of music from the driving-seat headphone 7, passenger-seat headphone 8, rear-right-seat headphone 9, and rear-left-seat headphone 10 if Messrs. A to D choose to receive music not from the driving-seat speaker 3, passenger-seat speaker 4, rear-right-seat speaker 5, and rear-left-seat speaker 6 but from the driving-seat headphone 7, passenger-seat headphone 8, rear-right-seat headphone 9, and rear-left-seat headphone 10.

Figure 4:
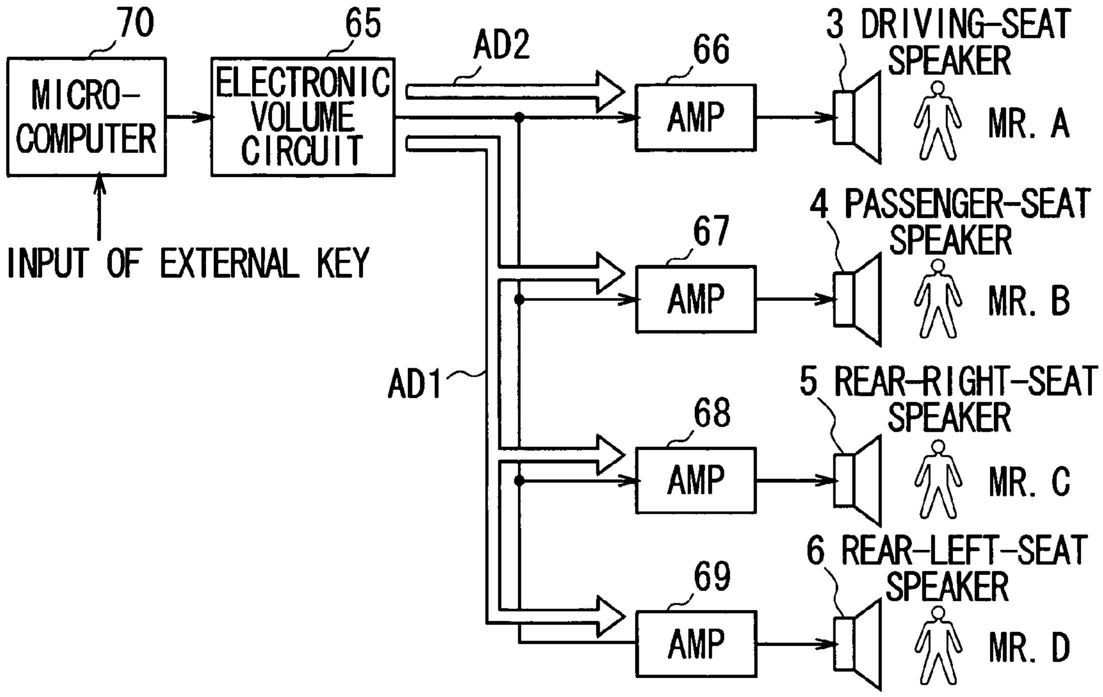
FIG. 4 is a schematic diagram for explaining an output control method (2)

As shown in FIG. 4, the microcomputer 70 is configured to output an audio signal AD2 of a different piece of music from the driving-seat speaker 3 and continue to output, from the passenger-seat speaker 4, rear-right-seat speaker 5, and rear-left-seat speaker 6, the audio signal AD1 of the same piece of music having been output until then if Mr. A receiving the audio signal AD1 of the piece of music from the driving-seat speaker 3, as shown in FIG. 3, chooses the different piece of music.

Assume that Mr. A having been sitting in the driving seat wants to take a rest and changes seats with Mr. C in the rear-right seat to have Mr. C take over driving. The microcomputer 70 is configured to recognize that Messrs. A and C have changed seats if Mr. A depresses the button switch "1" of the rear-right-seat authenticator 31 assigned to him after the change, and Mr. C depresses the button switch "3" of the driving-seat authenticator 11 assigned to him after the change or if Messrs. A and C hold their non-contact IC cards to the receivers 33 and 13 in the rear-right-seat authenticator 31 and driving-seat authenticator 11.

More specifically, the microcomputer 70 is configured to be able to recognize that Mr. A is sitting in the rear-right seat and is ready to receive music from the rear-right-seat speaker 5 and that Mr. C is sitting in the driving seat and is ready to receive music from the driving-seat speaker 3.

Figure 5:
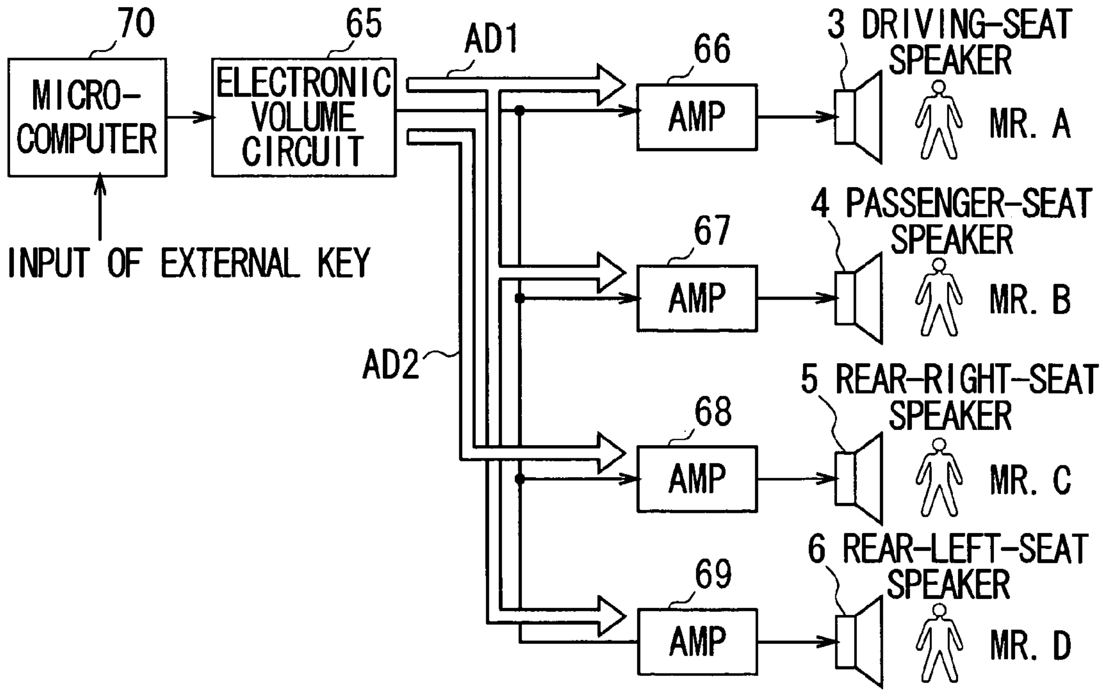
FIG. 5 is a schematic diagram for explaining an output control method (3)

As a result, as shown in FIG. 5, the microcomputer 70 is configured to make changes such that the audio signal AD2 of the piece of music having been listened to by Mr. A (FIG. 4) is output from the rear-right-seat speaker 5, an audio signal to be output from the driving-seat speaker 3 is returned from the audio signal AD2 to the audio signal AD1, and that the audio signal AD1 is output from the driving-seat speaker 3, passenger-seat speaker 4, and rear-left-seat speaker 6.

The procedure for the output control process using the output control methods (1) to (3) will be explained below.

(3-1) Procedure for Output Change Process Based on Depression of Button Switch

Figure 6:
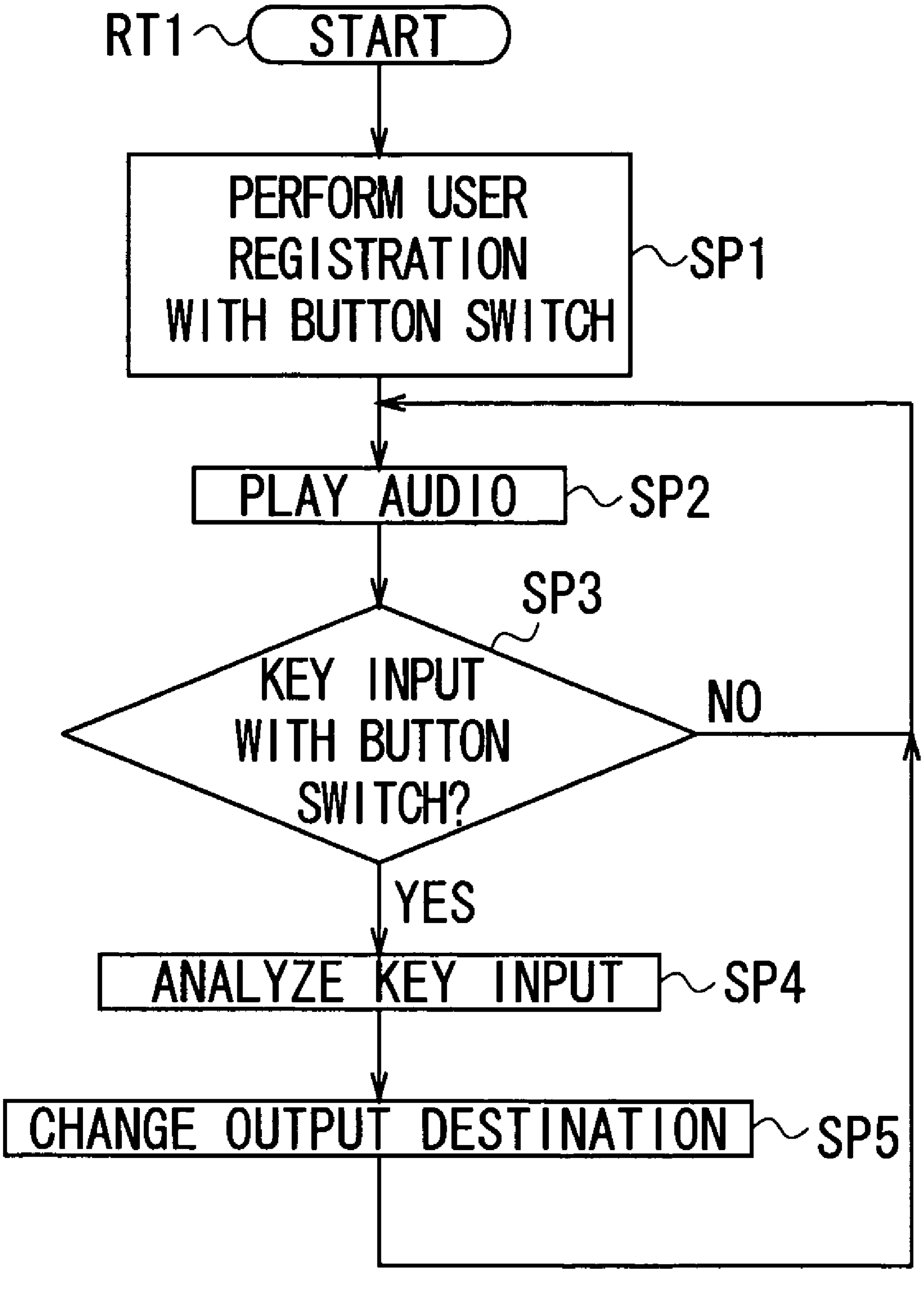
FIG. 6 is a flowchart showing the procedure for an output control process based on depression of a button switch.

The procedure for the output control process based on depression of a button switch, which the microcomputer 70 performs in accordance with an output destination control program stored in the ROM, will be explained more specifically using a flowchart in FIG. 6.

Upon power-up, the microcomputer 70 of the output controller 73 in the audio body 2 starts from the start step of a routine RT1 and shifts to step SP1.

In step SP1, when the microcomputer 70 confirms that user registration corresponding to button switch depression operation of Messrs. A to D is performed using the groups 12, 22, 32, and 42 of button switches in the driving-seat authenticator 11, passenger-seat authenticator 21, rear-right-seat authenticator 31, and rear-left-seat authenticator 41, it shifts to the next step (SP2).

In step SP2, the microcomputer 70 causes the hard disk drive 61 to almost concurrently play pieces of music arbitrarily chosen by Messrs. A to D in their seats and provides the different pieces of music from the driving-seat speaker 3, passenger-seat speaker 4, rear-right-seat speaker 5, and rear-left-seat speaker 6, respectively. The microcomputer 70 shifts to the next step (SP3).

In step SP3, the microcomputer 70 determines whether any of Messrs. A to D that has changed seats depresses any button switch of the groups 12, 22, 32, and 42 of button switches in the driving-seat authenticator 11, passenger-seat authenticator 21, rear-right-seat authenticator 31, and rear-left-seat authenticator 41, and any of the external keys S1A to S1D corresponding to the depression is input.

A negative result in step SP3 means that none of the external keys S1A to S1D is input and that none of Messrs. A to D has changed seats. In this case, the microcomputer 70 returns to step SP2 to continue to play the pieces of music as before.

On the other hand, a positive result in step SP3 means that at least one of Messrs. A to D has changed seats, a button switch labeled with the number assigned to each user who has changed seats is depressed in the driving-seat authenticator 11, passenger-seat authenticator 21, rear-right-seat authenticator 31, or rear-left-seat authenticator 41, and that a corresponding one of the external keys S1A to S1D is input. In this case, the microcomputer 70 shifts to the next step (SP4).

In step SP4, the microcomputer 70 recognizes who, out of Messrs. A to D, has changed seats and to which seat he has changed his seat by analyzing the one of the external keys S1A to S1D supplied from the authentication manager 50. Then, the microcomputer 70 shifts to step SP5.

In step SP5, the microcomputer 70 is configured to store which piece of music has been output from the speaker for a seat before the seat change and the elapsed playing time of the piece of music in the memory 62. The microcomputer 70 outputs the same piece of music as that having been output from the speaker for the seat before the seat change from a point ahead by the elapsed playing time of the beginning, thereby changing the output destination. The microcomputer 70 returns to step SP2.

As described above, the microcomputer 70 is configured to, if a button switch labeled with the number assigned to each user who has changed seats is depressed in the driving-seat authenticator 11, passenger-seat authenticator 21, rear-right-seat authenticator 31, or rear-left-seat authenticator 41, control to continue to play, from the speaker for a seat after the seat change, the same piece of music as that having been output from the speaker for a seat before the seat change and change the output destination from the speaker before the seat change to the speaker after the seat change. With this arrangement, the microcomputer 70 can output, from the speaker after the seat change, the same piece of music as that before the seat change even if a plurality of users change seats.

(3-2) Procedure for Output Control Process Using Non-Contact IC Card

Figure 7:
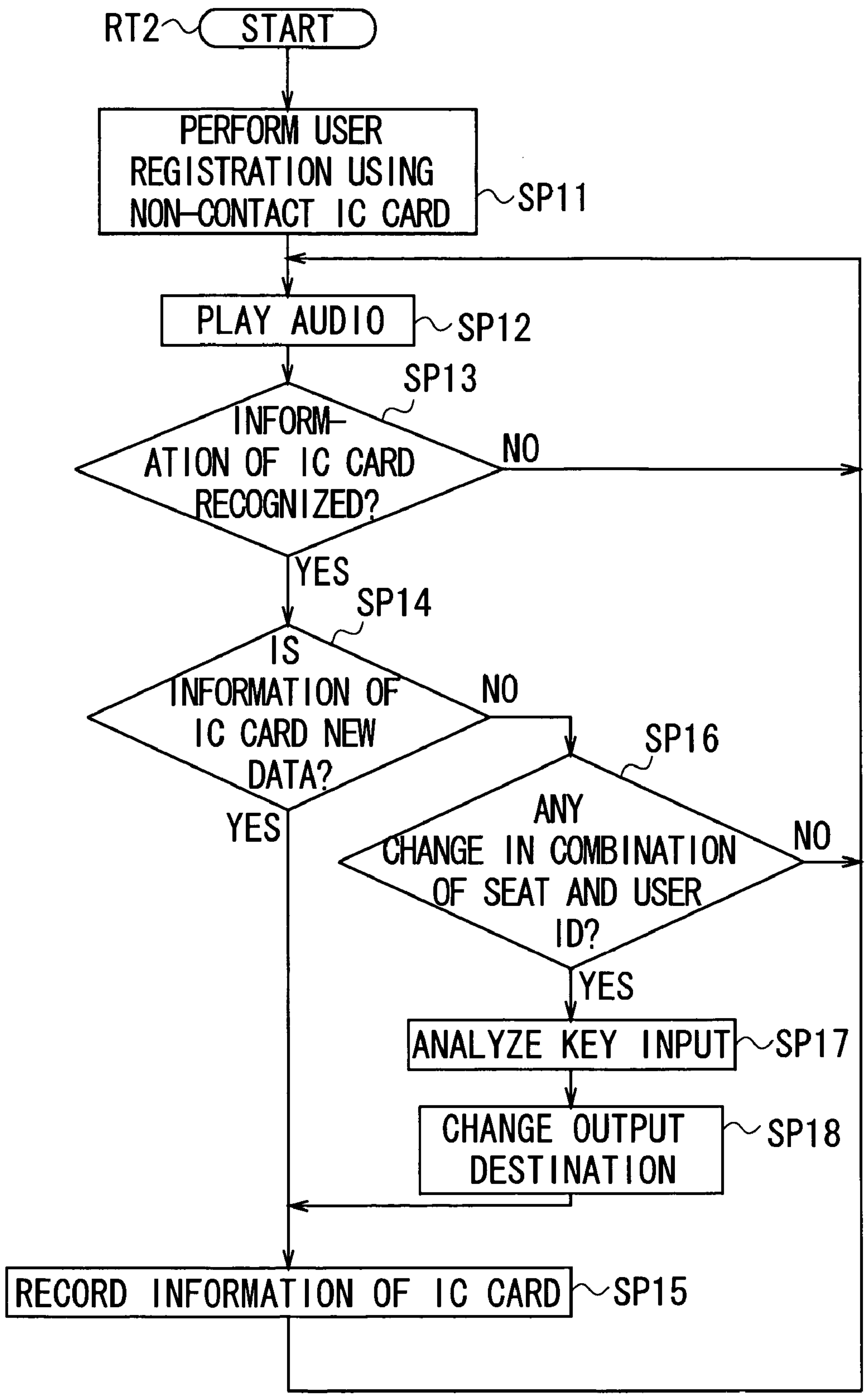
FIG. 7 is a flowchart showing the procedure for an output control process using a non-contact IC card.

The procedure for an output control process using a non-contact IC card, which the microcomputer 70 performs in accordance with the output control program stored in the ROM, will be explained more specifically using a flowchart in FIG. 7.

Upon power-up, the microcomputer 70 of the output controller 73 in the audio body 2 starts from the start step of a routine RT2 and shifts to step SP11.

In step SP11, when the microcomputer 70 confirms that user registration is performed on the basis of non-contact IC cards respectively held by Messrs. A to D to the receivers 13, 23, 33, and 43 in the driving-seat authenticator 11, passenger-seat authenticator 21, rear-right-seat authenticator 31, and rear-left-seat authenticator 41, it shifts to the next step (SP12).

In step SP12, the microcomputer 70 causes the hard disk drive 61 to almost concurrently play a plurality of pieces of music arbitrarily chosen by Messrs. A to D through operation buttons (not shown) provided in the driving-seat authenticator 11, passenger-seat authenticator 21, rear-right-seat authenticator 31, and rear-left-seat authenticator 41 for the respective seats and provides the different pieces of music from the driving-seat speaker 3, passenger-seat speaker 4, rear-right-seat speaker 5, and rear-left-seat speaker 6. The microcomputer 70 shifts to the next step (SP13).

In step SP13, the microcomputer 70 determines whether the non-contact IC card of any of Messrs. A to D that has changed seats is held to any of the receivers 13, 23, 33, and 43 in the driving-seat authenticator 11, passenger-seat authenticator 21, rear-right-seat authenticator 31, and rear-left-seat authenticator 41, and the information of the non-contact IC card is recognized.

A negative result in step SP13 means that none of the non-contact IC cards of Messrs. A to D is held to the receivers 13, 23, 33, and 43 in the driving-seat authenticator 11, passenger-seat authenticator 21, rear-right-seat authenticator 31, and rear-left-seat authenticator 41 after a seat change, i.e., none of Messrs. A to D has changed seats. In this case, the microcomputer 70 returns to step SP12 to continue to play the pieces of music.

On the other hand, a positive result in step SP13 means that the non-contact IC card of at least one of Messrs. A to D is held to one of the receivers 13, 23, 33, and 43 in the driving-seat authenticator 11, passenger-seat authenticator 21, rear-right-seat authenticator 31, and rear-left-seat authenticator 41, i.e., at least one of Messrs. A to D has changed seats. In this case, the microcomputer 70 shifts to the next step (SP14).

In step SP14, the microcomputer 70 determines whether the information of the non-contact IC card recognized in step SP13 is brand-new data which has never been registered.

A positive result in step SP14 means that the information of the non-contact IC card belongs to an unregistered user, and that the user needs to be newly registered. In this case, the microcomputer 70 shifts to the next step (SP15).

In step SP15, the microcomputer 70 performs user registration by storing the new data of the unregistered user read from the non-contact IC card in a registration data storage area of the hard disk drive 61, which is different from the music storage area. After that, the microcomputer 70 returns to step SP12 to continue to provide music to the remaining users who have not changed seats.

On the other hand, a negative result in step SP14 means that the information of the non-contact IC card belongs to a registered user, and that the user need not be newly registered. In this case, the microcomputer 70 shifts to the next step (SP16).

In step SP16, the microcomputer 70 determines that the non-contact IC card of any of Messrs. A to D that is already registered as a user is held to and whether any change occurs in combination of his seat and the user ID read from the non-contact IC card.

If a negative result is obtained in step SP16, the microcomputer 70 can determine that none of Messrs. A to D has changed seats. In this case, the microcomputer 70 returns to step SP12 to continue to provide music as before.

On the other hand, a positive result in step SP16 means that at least one of Messrs. A to D has changed seats. In this case, the microcomputer 70 receives, from the authentication manager 50, input of one corresponding to the seat change out of the external keys S1A to S1D. After that, the microcomputer 70 shifts to the next step (SP17).

In step SP17, the microcomputer 70 recognizes who, out of Messrs. A to D, has changed seats and to which seat he has changed his seat by analyzing the one of the external keys S1A to S1D supplied from the authentication manager 50. Then, the microcomputer 70 shifts to step SP18.

In step SP18, the microcomputer 70 reads, from the memory 62, which piece of music has been output from the speaker for a seat before the seat change and the elapsed playing time of the piece of music. On the basis of this, the microcomputer 70 outputs, from the speaker for a seat after the change, the same piece of music as that having been output from the speaker for the seat before the seat change from a point ahead by the elapsed playing time of the beginning, thereby changing the output destination. The microcomputer 70 shifts to step SP15.

As described above, the microcomputer 70 is configured to, if any of the receivers 13, 23, 33, and 43 in the driving-seat authenticator 11, passenger-seat authenticator 21, rear-right-seat authenticator 31, and rear-left-seat authenticator 41 after a seat change recognizes the information of the non-contact IC card of a user who has changed seats, continue to output and play, from the speaker after the seat change, the same piece of music as that having been output from the speaker before the seat change and change the output destination from the speaker before the seat change to the speaker after the seat change. With this arrangement, the microcomputer 70 can change the output destination of music with simple operation that involves causing a user to hold a non-contact IC card even if the user has changed seats.

(3-3) Procedure for Output Destination Change Process from Headphone to Speaker

The procedure for an output control process of forcibly changing the output destination from headphones to speakers such that music provision through the separate headphones 7 to 10 is changed to that through all of the driving-seat speaker 3, passenger-seat speaker 4, rear-right-seat speaker 5, and rear-left-seat speaker 6 will be explained. The procedure is performed if the microcomputer 70 is providing music not from the driving-seat speaker 3, passenger-seat speaker 4, rear-right-seat speaker 5, and rear-left-seat speaker 6 but from the driving-seat headphone 7, passenger-seat headphone 8, rear-right-seat headphone 9, and rear-left-seat headphone 10 according to users' own choice, and certain conditions are met.

Figure 8:
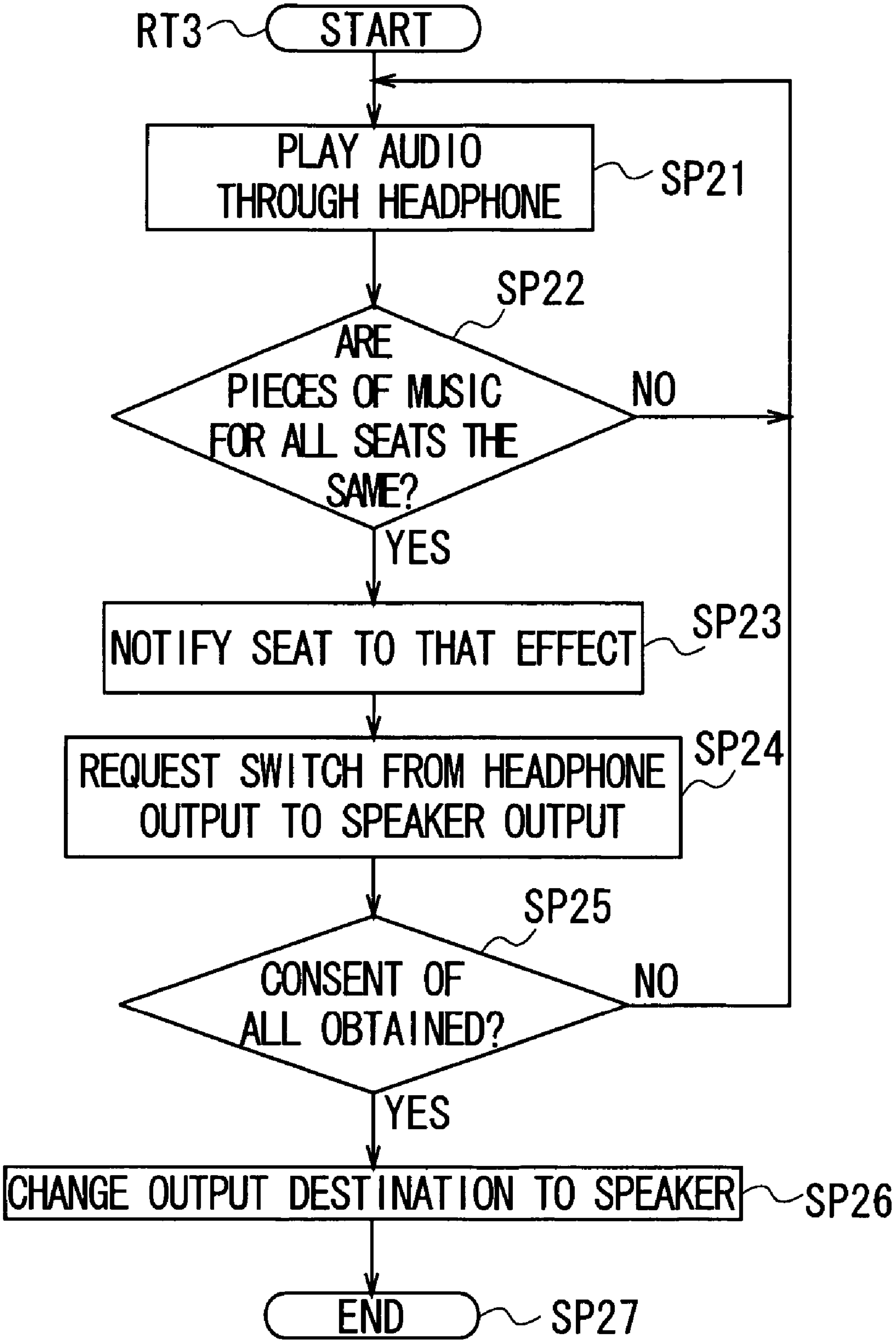
FIG. 8 is a flowchart showing the procedure for an output control process from headphones to speakers.

As shown in FIG. 8, the procedure for the output control process of changing the output destination from headphones to speakers, which the microcomputer 70 performs in accordance with the content provision program stored in the ROM, will be explained. The microcomputer 70 starts from the start step of a routine RT3 and shifts to step SP21.

In step SP21, the microcomputer 70 causes the hard disk drive 61 to almost concurrently play different pieces of music arbitrarily chosen by Messrs. A to D in their seats and provides the pieces of music from the driving-seat headphone 7, passenger-seat headphone 8, rear-right-seat headphone 9, and rear-left-seat headphone 10, respectively. The microcomputer 70 shifts to step SP22.

In step SP22, the microcomputer 70 determines whether the pieces of music concurrently played by the hard disk drive 61 are one and the same. If a negative result is obtained in step SP22, the microcomputer 70 returns to step SP21 to continue to play music. On the other hand, if a positive result is obtained in step SP22, the microcomputer 70 shifts to the next step (SP23).

In step SP23, since all of Messrs. A to D are receiving the same piece of music in the driving seat, passenger seat, rear-right seat, and rear-left seat, the microcomputer 70 notifies them to that effect through the display unit 14 of the driving-seat authenticator 11, display unit 24 of the passenger-seat authenticator 21, display unit 34 of the rear-right-seat authenticator 31, and display unit 44 of the rear-left-seat authenticator 41. The microcomputer 70 shifts to the next step (SP24).

When the audio body 2 is powered up, and Messrs. A to D start playing music in the hard disk drive 61, they are likely to play the same piece of music. In this case, there often arises a situation wherein all of Messrs. A to D are receiving the same piece of music.

In step SP24, if all of Messrs. A to D are receiving the same piece of music in the driving seat, passenger seat, rear-right seat, and rear-left seat, the microcomputer 70 can determine that it can achieve a greater surround-sound effect in the space in the vehicle and can provide a more comfortable acoustic space by outputting the same piece of music using all of the driving-seat speaker 3, passenger-seat speaker 4, rear-right-seat speaker 5, and rear-left-seat speaker 6 than by outputting it through the separate headphones 7 to 10. For this reason, the microcomputer 70 asks permission of Messrs. A to D to switch from headphone output with the separate headphones 7 to 10 to speaker output with all the speakers 3 to 6. The microcomputer 70 shifts to the next step (SP25).

In step SP25, the microcomputer 70 determines whether permission of all of Messrs. A to D in their seats to switch from headphone output to speaker output is obtained. If permission of all is not obtained, a negative result is obtained, and the microcomputer 70 returns to step SP21 to continue headphone output. On the other hand, if a positive result is obtained, the microcomputer 70 shifts to the next step (SP26).

In step SP26, the microcomputer 70 switches from individually providing the same piece of music through the driving-seat headphone 7, passenger-seat headphone 8, rear-right-seat headphone 9, and rear-left-seat headphone 10 to providing it through all of the driving-seat speaker 3, passenger-seat speaker 4, rear-right-seat speaker 5, and rear-left-seat speaker 6. The microcomputer 70 shifts to step SP27 to end the process.

Figure 9:
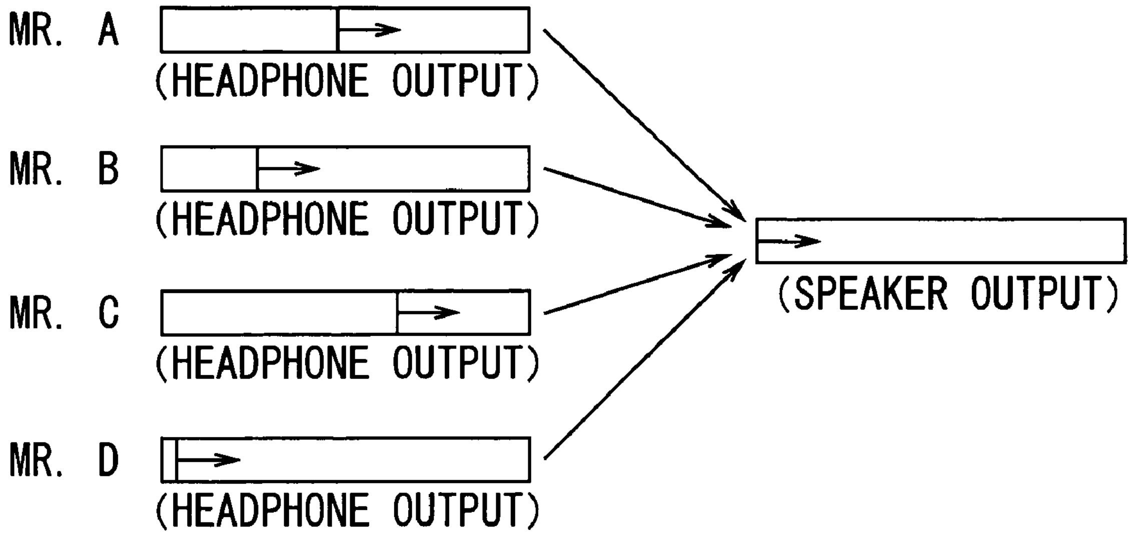
FIG. 9 is a schematic chart for explaining a pattern (1) of change from headphone output to speaker output.

At this time, all of Messrs. A to D receiving the same piece of music may be different in elapsed playing time (indicated by arrows) of the same piece of music, as shown in FIG. 9. The microcomputer 70 is configured to play the same piece of music again from the beginning in switching from headphone output to speaker output.

Figure 10:
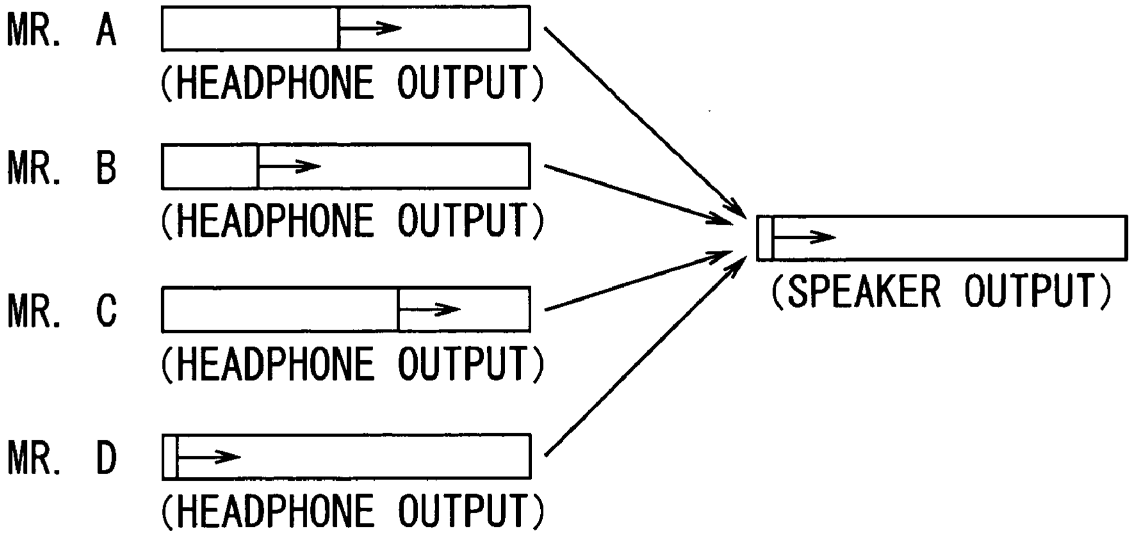
FIG. 10 is a schematic chart for explaining a pattern (2) of change from headphone output to speaker output.

As shown in FIG. 10, in switching from headphone output to speaker output, the microcomputer 70 may switch from headphone output to speaker output and play the same piece of music from a point ahead by the elapsed playing time for Mr. D, which is the shortest, of the beginning.

If the microcomputer 70 switches from headphone output to speaker output and plays the piece of music from a point ahead by the elapsed playing time for Mr. C, which is the longest, of the beginning, Messrs. A, B, and C partially miss the piece of music. If the microcomputer 70 plays the piece of music from a point ahead by the elapsed playing time for Mr. D of the beginning, Messrs. A to C have to briefly listen to the played part of the piece of music again, but Mr. D does not miss any part. The whole of the piece of music can be provided to all thoroughly.

(4) Operation and Effect

In the above-mentioned arrangement, the microcomputer 70 of the audio body 2 stores, in the memory 62, which pieces of music are individually provided to Messrs. A to D through the driving-seat speaker 3, passenger-seat speaker 4, rear-right-seat speaker 5, and rear-left-seat speaker 6 and the elapsed playing times of the pieces of music.

The driving-seat authenticator 11, passenger-seat authenticator 21, rear-right-seat authenticator 31, and rear-left-seat authenticator 41 of the authentication manager 50 are configured to be able to individually recognize Messrs. A to D in response to depression operation of the groups 12, 22, 32, and 42 of button switches or operation of holding non-contact IC cards to the receivers 13, 23, 33, and 43. With this arrangement, even if Messrs. A to D have changed seats, the positional relationships before and after the seat change can be correctly grasped.

For this reason, if Messrs. A to D change seats, the microcomputer 70 of the audio body 2 can play and output, from each speaker after the seat change, the same piece of music as that having been output from the corresponding speaker before the seat change from a point ahead by the elapsed playing time of the beginning. Each user need not perform troublesome operation such as choosing a piece of music again after the seat change. The user can automatically receive, from the speaker after the seat change, the same piece of music as that having been received before the seat change, with simple operation such as depression operation of a button switch or holding a non-contact IC card.

Assume that all of Messrs. A to D are listening to the same piece of music through the driving-seat headphone 7, passenger-seat headphone 8, rear-right-seat headphone 9, and rear-left-seat headphone 10, and the consent of all of Messrs. A to D is obtained. Only in this case, the microcomputer 70 of the audio body 2 switches from headphone output to speaker output using all of the driving-seat speaker 3, passenger-seat speaker 4, rear-right-seat speaker 5, and rear-left-seat speaker 6. When all of Messrs. A to D are listening to the same piece of music, the microcomputer 70 does not let them individually enjoy the piece of music through headphone output and switches to speaker output. This enables all of Messrs. A to D to enjoy the same piece of music together.

When Messrs. A to D are listening to the same piece of music through headphone output, the microcomputer 70 of the audio body 2 switches to speaker output using all of the driving-seat speaker 3, passenger-seat speaker 4, rear-right-seat speaker 5, and rear-left-seat speaker 6. With this operation, a so-called surround-sound effect, a sense of realism, and the like can be expected in the space in a vehicle, and sound effects much better than headphone output can be given to the users.

Assume that the in-vehicle audio system 1 provides different pieces of music to Messrs. A to D through the driving-seat speaker 3, passenger-seat speaker 4, rear-right-seat speaker 5, and rear-left-seat speaker 6. With the above-mentioned arrangement, even if Messrs. A to D change seats, and the speaker for each of them before the seat change becomes different from that after the seat change, the in-vehicle audio system 1 can individually recognize Messrs. A to D only by depression operation of the button switches in the driving-seat authenticator 11, passenger-seat authenticator 21, rear-right-seat authenticator 31, and rear-left-seat authenticator 41 or holding operation of non-contact IC cards. The in-vehicle audio system 1 can immediately provide, from the speakers after the seat change, the same pieces of music as those having been provided from the speakers before the seat change.

When Messrs. A to D are listening to the same piece of music through headphone output, the in-vehicle audio system 1 switches from headphone output to speaker output. When all of Messrs. A to D are listening to the same piece of music, speaker output enables them to enjoy the same piece of music together and get sound effects much better than headphone output.

(5) Other Embodiments

The above embodiment has described a case wherein music as content is provided using the driving-seat speaker 3, passenger-seat speaker 4, rear-right-seat speaker 5, and rear-left-seat speaker 6 serving as output means. The present invention, however, is not limited to this. Various pieces of content such as radio content, video content, game content, and the like may be provided using display devices comprising a monitor, display, and the like serving as a plurality of output means.

The embodiment has also described a case wherein which pieces of music are provided through the speakers for respective seats to Messrs. A to D and the elapsed playing times of the pieces of music are stored in the memory 62, and the output destination of each piece of music is changed using these pieces of information. The present invention, however, is not limited to this. In personal authentication using a non-contact IC card, which pieces of music are provided to Messrs. A to D and the elapsed playing times of the pieces of music may be previously recorded on their non-contact IC cards before a seat change, these pieces of information may be read from the non-contact IC cards together with user IDs after the seat change, and the output destinations of the pieces of music may be changed using the pieces of information.

The embodiment has described a case which employs the in-vehicle audio system 1 with four channels, the driving-seat speaker 3, the passenger-seat speaker 4, the rear-right-seat speaker 5, and the rear-left-seat speaker 6 located in the space in a vehicle. The present invention, however, is not limited to this. A multichannel audio system with a varying number of channels may be employed.

The embodiment has described a case wherein the output destination is switched from headphone output to speaker output if Messrs. A to D are listening to the same piece of music separately through the driving-seat headphone 7, passenger-seat headphone 8, rear-right-seat headphone 9, and rear-left-seat headphone 10. The present invention, however, is not limited to this. When Messrs. A to D are listening to not the same piece of music but the same album, the album may be played again from the first number, and the output destination may be switched from headphone output to speaker output. Alternatively, when Messrs. A to D are listening to pieces of music by the same artist, a commonly interested piece of music, i.e., one by the same artist may be played, and the output destination may be switched from headphone output to speaker output.

The embodiment has described a case wherein the output destination is switched from headphone output to speaker output when Messrs. A to D are listening to the same piece of music through the driving-seat headphone 7, passenger-seat headphone 8, rear-right-seat headphone 9, and rear-left-seat headphone 10, and the consent of Messrs. A to D is obtained. The present invention, however, is not limited to this. The output destination may be switched from headphone output to speaker output when the consent of not necessarily all but almost all of them is obtained.

The embodiment has described a case wherein the microcomputer 70 loads, into RAM, an output control program or content provision program prestored in ROM, and the above procedure for the output control process is performed in accordance with the output control program or content provision program. The present invention, however, is not limited to this. The procedure for the output control process may be performed by installing, in the audio body 2, a program storage medium storing the output control program or content provision program.

The embodiment has described a case wherein the in-vehicle audio system 1 serving as an in-vehicle device according to the present invention comprises the hard disk drive 61 serving as content provision means, the microcomputer 70 serving as user recognition means, the memory 62 serving as storage means, and the microcomputer 70 serving as control means. The present invention, however, is not limited to this. The in-vehicle audio system 1 as the in-vehicle device may have various other types of circuitry.

An in-vehicle device according to the present invention not only can be located in the space in a vehicle but also can be used in the space in a train or plane equipped with speakers or headphones for respective seats.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An in-vehicle device having a plurality of output means, comprising:

content provision means for individually outputting, to each of users, a piece of content arbitrarily chosen by the user from a plurality of pieces of content, using one of the plurality of output means;

user recognition means for individually recognizing the user who receives the piece of content through the one of the plurality of output means;

storage means for individually storing the piece of content provided to the user; and control means for, when said user recognition means recognizes that a user to receive the piece of content through the one of the plurality of output means is changed to another user, outputting a piece of content corresponding to said another user by controlling said content provision means.

2. The in-vehicle device according to claim 1, wherein said user recognition means individually recognizes the user in response to depression of a predetermined key previously assigned to the user and registered as one corresponding to the user.

3. The in-vehicle device according to claim 1, wherein said user recognition means individually recognizes the user by authenticating the user through a non-contact IC card associated with the user.

4. The in-vehicle device according to claim 1, wherein said control means prestores an elapsed playing time of the piece of content provided to the user in addition to the piece of content provided to the user, and when said user recognition means recognizes that a user to receive the piece of content is changed to another user, said control means outputs a piece of content corresponding to said another user from a point measured from a beginning of the piece of content plus the elapsed playing time.

5. An output control method for an in-vehicle device, comprising:

a user recognition step of, when individually outputting, to each of users, a piece of content arbitrarily chosen by the user from a plurality of pieces of content, using one of a plurality of output means, individually recognizing the user who receives the piece of content through the one of the plurality of output means; and a control step of prestoring the piece of content provided to the user, and upon recognition that a user to receive the piece of content is changed to another user, outputting a piece of content corresponding to said another user.

6. An output control program for causing an in-vehicle device having a plurality of output means to execute:

a user recognition step of, when individually outputting, to each of users, a piece of content arbitrarily chosen by the user from a plurality of pieces of content, using one of the plurality of output means, individually recognizing the user who receives the piece of content through the one of the plurality of output means; and a control step of prestoring the piece of content provided to the user, and upon recognition that a user to receive the piece of content is changed to another user, outputting a piece of content corresponding to said another user.

* * * * *